United States Patent
Dietl et al.

(10) Patent No.: US 9,225,216 B2
(45) Date of Patent: Dec. 29, 2015

(54) ELECTRIC MOTOR AND METHOD OF PRODUCING AN ELECTRIC MOTOR THAT IS COMMUTATED ELECTRONICALLY

(75) Inventors: Lothar Dietl, Aalen (DE); Tobias Hokenmaier, Rechberghausen (DE); Christoph Maier, Notzingen (DE)

(73) Assignee: C. & E. Fein GmbH (DE)

( * ) Notice: Subject to any disclaimer, the term of this patent is extended or adjusted under 35 U.S.C. 154(b) by 479 days.

(21) Appl. No.: 13/166,412

(22) Filed: Jun. 22, 2011

(65) Prior Publication Data

US 2011/0316371 A1    Dec. 29, 2011

(30) Foreign Application Priority Data

Jun. 23, 2010 (DE) .......... 10 2010 025 261

(51) Int. Cl.
H02K 3/50 (2006.01)

(52) U.S. Cl.
CPC .............. *H02K 3/50* (2013.01); *H02K 2203/09* (2013.01); *Y10T 29/49009* (2015.01)

(58) Field of Classification Search
CPC . H02K 2203/09; H02K 3/50; H02K 11/0068; H02K 2203/03; H02K 3/46; H02K 3/52; H02K 3/522
USPC .......................................................... 310/71
See application file for complete search history.

(56) References Cited

U.S. PATENT DOCUMENTS

| | | | |
|---|---|---|---|
| 4,287,446 A * | 9/1981 | Lill et al. | 310/71 |
| 4,963,107 A | 10/1990 | Koster | |
| 6,369,473 B1 | 4/2002 | Baumeister et al. | |
| 2002/0067092 A1* | 6/2002 | Crapo et al. | 310/156.47 |
| 2004/0027014 A1* | 2/2004 | Weigold et al. | 310/68 R |
| 2006/0038457 A1* | 2/2006 | Miyata | 310/156.45 |
| 2007/0273221 A1* | 11/2007 | Kinoshita et al. | 310/58 |
| 2008/0231133 A1* | 9/2008 | Staudemann et al. | 310/154.45 |
| 2009/0324435 A1* | 12/2009 | Sears et al. | 417/423.7 |
| 2010/0219713 A1* | 9/2010 | Staudenmann | 310/208 |

FOREIGN PATENT DOCUMENTS

| | | | | |
|---|---|---|---|---|
| DE | 3810963 A1 | 10/1989 | | |
| EP | 0993095 A1 | 4/2000 | | |
| EP | 1050948 A2 | 11/2000 | | |
| WO | 02087057 A1 | 10/2002 | | |
| WO | 2006050765 A1 | 5/2006 | | |
| WO | WO 2007012207 A1 * | 2/2007 | | H02K 3/28 |
| WO | WO 2009015496 A1 * | 2/2009 | | H02K 11/00 |
| WO | WO 2009055942 A1 * | 5/2009 | | H02K 3/18 |
| WO | 2009139067 A1 | 11/2009 | | |

* cited by examiner

*Primary Examiner* — Quyen Leung
*Assistant Examiner* — Eric Johnson
(74) *Attorney, Agent, or Firm* — St. Onge Steward Johnston & Reens, LLC

(57) ABSTRACT

An electric motor, in particular a motor which can be commutated electronically, is disclosed. The motor comprises a stator with a plurality of field windings which are wound at least in places from a winding wire, and further comprises a contact grid for making contact with the field windings, which contact grid has a plurality of conductor tracks which are insulated from one another, with the conductor tracks having contacts to which the winding wire is fixed, wherein the winding wire is cut through between specific contacts such that this results in the field windings being connected in a manner which is suitable for generating a rotating field when being powered by a suitable motor controller.

20 Claims, 5 Drawing Sheets

ELECTRIC MOTOR AND METHOD OF PRODUCING AN ELECTRIC MOTOR THAT IS COMMUTATED ELECTRONICALLY

CROSS REFERENCES TO RELATED APPLICATIONS

This application claims priority from German patent application 10 2010 025 261.1, filed on Jun. 23, 2010, the entire contents of which is incorporated herein by reference.

BACKGROUND OF THE INVENTION

The invention relates to an electric motor, in particular a motor which can be commutated electrically for a hand-held tool having a stator with a plurality of field windings which are wound at least in places from a winding wire, having a contact grid for making contact with the field windings, which contact grid has a plurality of conductor tracks which are insulated from one another, with the conductor tracks having contacts to which the winding wire is fixed.

The invention furthermore relates to a method for production of an electric motor.

An electric motor such as this is known from WO 2002/087057 A1.

The known electric motor is an electronically commutated direct-current motor having a stamped grid on which contact is made with pins, winding phases, power connections and connections of further components. The stamped grid has an upper grid layer and a lower grid layer, which each have a number of contacts.

A compact configuration of the electric motor is assisted by a stamped grid such as this. However, it has been found that the production and in particular the handling of the grid layers of stamped grids such as these is particularly complex when a plurality of different contacts are intended to be provided in one grid layer. In the end, this results in contact areas which have to be completely separated from other areas of the respective grid layer during the course of production, in order to allow them to be insulated.

DE 38 10 963 C2 discloses a grid composed of electrically conductive sheet metal material for making contact with an electric motor, as well as a method for production of a grid.

The known grid is a deep-drawn part which is in the form of a cup or pot or else a half-round shell, and has conductor tracks which are insulated from one another but which need be insulated only during the course of production or processing of the grid, in order to ensure the isolation. This fundamentally also requires complex production, handling and processing.

SUMMARY OF THE INVENTION

In view of this it is an object of the invention to disclose an electric motor, in particular a motor which can be commutated electronically for a hand-held tool.

It is a second object of the invention to disclose an electric motor which can be produced and assembled in a simple manner that can be automated.

It is a third object of the invention to disclose an electric motor which wherein a simple and reliable contacting for the field windings is provided.

It is a forth object of the invention to disclose an electric motor which has as compact design.

It is a fifth object of the invention to disclose an electric motor which has as high performance.

It is a sixth object of the invention to disclose a method of making an electric motor that is simple and that can preferably be automated.

According to one aspect these and other objects are achieved by an electric motor comprising:

a rotor having a permanent-magnet excitation;

a stator having a plurality of field windings which are wound at least partially from a winding wire;

a contact grid for making contact with said field windings;

a plurality of conductor tracks provided on said contact grid, said conductor tracks being insulated from one another;

a plurality of contacts provided on said conductor tracks to which said winding wire is fixed;

a motor controller coupled with said field windings via said contact grid for powering said field windings for generating a rotating electric field;

wherein said winding wire is severed between selected ones of said contacts for electrically connecting said field windings in a manner suitable for generating said rotating electric field when being powered by said motor controller.

According to another aspect these and other objects of the invention are achieved by a method comprising the following steps:

providing a motor controller for generating a rotating electric field;

providing a rotor;

providing a stator;

winding a plurality of field windings at least partially continuously from a winding wire on said stator;

providing a contact grid having a plurality of conductor tracks being insulated from one another to said stator, wherein said conductor tracks have a plurality of contacts;

fixing said winding wire on selected contacts on said conductor tracks;

coupling said motor controller with selected ones of said contacts; and severing said winding wire between selected ones of said contacts for electrically connecting said field windings in a manner suitable for generating said rotating electric field when being powered by said motor controller.

The object of the invention is achieved in this way.

This is because, according to the invention, this results in the field windings being connected in a particularly simple manner which results, in a surprising manner, to a certain extent as a biproduct of the winding.

After a winding process in which the field windings are wound approximately completely from a winding wire, the specific cutting of individual sections of the winding wire in areas between the contact between different field windings results in these field windings being specifically associated with individual conductor tracks. This avoids complex intermediate steps. As soon as the winding wire has been fixed to the contacts of the contact grid, the electric motor is highly mechanically robust, thus making it possible to considerably reduce the effort in fixing and securing specific components to be fitted.

Since the winding wire which is used to wind the field windings is fixed to the contacts of the conductor tracks, this likewise results in the contact grid being fixed to the stator, in such a way that there is no need for separate attachment of the contact grid. This also considerably reduces the production and assembly effort.

In this case, contact can be made directly between the conductor tracks and the winding wire over a large area without any "bottle neck". In order to carry more current, the conductor tracks may have large current-carrying cross sections thus making it possible, overall, to reduce resistive losses in the contact with the field windings. This results in an improvement in the performance of the electric motor, while reducing the power lost in the form of heat emission.

According to a further refinement of the electric motor according to the invention, the conductor tracks are stamped or cut out of a flat conductive semi-finished product.

This makes it possible to considerably increase the strength of the conductor tracks, while likewise making it possible to further reduce the line losses, because the current-carrying areas have large cross sections.

Alternatively or additionally, the conductor tracks can be produced using deep-drawing processes and/or bending processes.

By way of example, in this case, the individual conductor tracks have only the contacts of one phase or the star point of a circuit. In this case, it is possible to avoid complex production steps, in particular complex cutting and shaping processes, as are required in the case of conductor tracks in which a plurality of mutually insulated lines are provided which, for example, can finally be separated from one another only in the course of an additional manufacturing step during the further processing.

Furthermore, the conductor tracks allow the use of at least similar tools, semi-finished products, intermediate products or matrices. In the case of a three-phase, star-connected motor, for example, this results in a total of four at least similar conductor tracks.

In order to reduce the production effort further, it is preferable for at least some of the conductor tracks to be identical, or to be manufactured from identical semi-finished products, in particular stamped blanks.

According to a further aspect of the invention, the conductor tracks have an essentially annular base body, from which arms project, on which the contacts are formed.

This measure makes it possible to produce an approximately star-shaped configuration, in which each arm of a conductor track is designed to make contact with in each case one field winding of the same phase.

The contact grid can now have a stack of conductor tracks in a simple form, in which the base bodies are arranged one behind the other, and the arms are in each case offset by a specific amount with respect to a previous conductor track or a subsequent conductor track.

The possibility of holding on the base body simplifies assembly and handling, since the conductor tracks are highly robust in this area. Production can be even further simplified.

According to one development of the invention, the contacts are designed for clamping and/or joining in order to fix the winding wire.

This allow a contact to be made particularly well with the winding wire via a force fit and/or via an integral joint. The fixing of the winding wire to the contacts likewise includes the contact grid being fixed to the stator. A plurality of components can therefore be assembled and connected with only one set of joining processes.

Particularly in the case of an integral joining method for making contact with the winding wire, insulation on the winding wire can be removed by thermal effects.

It is self-evident that, in addition to welding methods, methods for soldering or bonding can be used for thermal joining. The winding wire can likewise be joined directly or indirectly, that is to say for example by direct soldering or else by being clamped between two limbs of a contact which are welded to one another.

According to a further aspect of the invention, four conductor tracks are provided, three conductor tracks of which are each designed to make contact with one phase of the field windings, and the fourth conductor track is designed as a contact of a star point.

This allows the conductor tracks to be functionally separated from one another in such a way that no direct contacts are required between the conductor tracks.

In the case of an electric motor which can be commutated electronically and which is driven by a three-phase, delta-connected alternating field, the contact grid in contrast preferably has three conductor tracks, each of which makes contact with one, and only one, of the phases.

According to a further refinement of the invention, the contact grid has a support structure, in particular at least partial plastic insert moulding.

This measure makes it possible to considerably simplify handling during production and assembly. Designed in this way, the contact grid is highly insensitive to external forces.

The plastic insert moulding can likewise be used for insulation of the individual conductor tracks in the contact grid. In this case, for example, four conductor tracks are stacked one on top of the other, thus resulting in an extremely firm component overall. The large cross-sections of the conductor tracks in this case ensure low thermal losses, thus making it possible to prevent a heat build-up or the like in the contact grid, with at least partial plastic insert moulding.

Encapsulation of the mutually aligned conductor tracks, for example with plastic or a casting resin, combines the conductor tracks and can in the process secure their relative position with respect to one another, as well as isolating the conductor tracks from one another.

According to one development of the invention, the contact grid furthermore has contacts for making contact, in particular direct contact, with a motor controller.

This allows the electric motor to be designed to be highly integrated, while short line paths allow extremely low line losses.

This makes it possible to produce a compact assembly, which comprises at least the stator, the contact grid and the motor controller. Particularly in the case of an electronically commutated motor, only a small amount of heat can be expected to be developed in the interior of the motor, that is to say in a rotor, which means that there is no need to expect any negative influence resulting from heat emission from the motor, even if the motor controller is adjacent to the field windings.

Furthermore, if measures for heat dissipation from the electric motor are taken in any case, then waste heat can therefore also be dissipated from the motor controller.

In one preferred refinement of the invention, the contact grid has moulded elements, in particular tabs, recesses or projections, for handling and for simplifying assembly.

By way of example, the moulded elements may be provided as interlocking elements or stops on the support structure of the contact grid. This makes it possible to achieve a further improvement in the assembly capability. Automated assembly is assisted, and manual assembly processes can likewise be simplified, with assembly errors being avoided.

It may also be preferable for some or all of the moulded elements to be designed to be asymmetric, or to be arranged asymmetrically on the contact grid, in order to further reduce the risk of assembly errors.

According to one development of this refinement, some of the tabs are designed for alignment of the motor controller with respect to the contact grid, and other tabs are designed for alignment of the contact grid with respect to the stator.

This allows the motor controller to be aligned indirectly with respect to the stator, using the contact grid. The moulded elements on the contact grid can be designed to interact with the stator, and likewise to interact with the motor controller. In this case, individual moulded elements can predetermine the alignment of the contact grid with respect to the stator, and other moulded elements can predetermine the alignment of the motor controller with respect to the contact grid. Furthermore, the tabs may be used as centering elements, and likewise also as stop surfaces.

According to one development of this refinement, the projections are designed for guidance and changing the direction of the winding wire.

By way of example, in this case, the direction of the winding wire can be changed on a circumference of the projections while, in contrast, a height of the projections can be used to define a stop for a fitting of the contact grid or of adjacent parts.

Further functions can therefore be integrated in the contact grid without any need for further components. This makes it possible to considerably simplify the production of the electric motor.

In one expedient development of the invention, the contact grid has an opening with a free passage, in particular an internal diameter, and an external diameter, and in that an internal diameter/external diameter ratio of about 1:1.5 to 1:2.5 is provided, preferably from 1:1.8 to 1:2.0.

By way of example, this allows a rotor or a motor shaft to be fed to the stator through the contact grid during the course of manufacture. The stator can be assembled in advance together with the contact grid as a compact unit, without making subsequent assembly steps harder.

The remaining line cross section of the individual conductor tracks in this case furthermore allows high currents to be carried with low losses. The resultant annular shape of the base body is likewise sufficiently solid to ensure that the conductor tracks are mechanically robust.

According to one development of this refinement, the internal diameter corresponds essentially to an internal diameter of the stator of the electric motor and is about 15 to 30 mm, preferably 18 to 24 mm, and furthermore preferably approximately 22 mm.

It is self-evident that the free passage for the rotor need not necessarily be circular. An at least essentially circular opening is actually preferable, since geometries such as these can be manufactured easily, in particular by means of stamping methods or cutting methods.

According to a further aspect of the invention, the field windings are wound continuously from the winding wire.

This refinement in particular exploits the advantages of making contact via the contact grid, to a major extent. The winding wire can be wound completely around all of the field windings of the stator, without having to be intermediately capped. In its final form, cut at specific positions between contacts with different conductor tracks, this allows even complex electric motors, with large numbers of pole pairs and with many field windings connected to one another to be connected in a simple manner.

In this case, it is self-evident that the continuous winding process can be carried out both continuously in time, and with interruptions. By way of example, pauses can occur in the case of a process-related movement of the stator to be wound, or of a winding apparatus.

According to a further refinement of the invention, the field windings are connected in star or delta.

This allows the rotation speed and torque of the electric motor to be matched to given operating conditions, in a simple manner. In principle, a higher torque can be produced when connected in star. In contrast, in principle, delta connection results in higher rotation speeds.

According to one development of the invention, at least some of the field windings are connected in parallel.

An electric motor according to the invention can be used particularly advantageously in a hand-held tool.

The hand-held tool may be a tool for drilling, screwdriving, hammer drilling, sawing, grinding or polishing. Electronically commutated electric motors generally have a control device for production of a rotating field, or are controlled by a control device. In this case, the control device is generally supplied with direct current. To this extent, it is preferable for the hand-held tool to have a power supply device, in particular a rechargeable battery.

The method according to the invention for production of an electric motor is developed by the step of clamping and/or joining the conductor track to the contacts for fixing the winding wire and the contact grid.

According to a further aspect of the method according to the invention, the manufacture of the contact grid comprises the following steps:
  arranging and aligning the plurality of conductor tracks separated and in a relative position with respect to one another, and
  encapsulating, in particular insert moulding, the plurality of conductor tracks in order to produce a support structure.

This results in a supporting structure for the contact grid, which can considerably simplify the subsequent handling steps and manufacturing processes. Furthermore, the support structure may have shape elements which simplify the feeding and the assembly of the contact grid. This further improves the suitability for highly automated manufacture. Furthermore, the conductor tracks can be insulated from one another by the encapsulation process.

Particularly when using a contact grid with a free passage, for example an internal diameter which corresponds essentially to an internal holding diameter of the stator, a rotor can easily be fed through the contact grid to the stator during the rest of the manufacturing process.

It is self-evident that the features of the invention mentioned above and those which are still to be explained in the following text can be used not only in the respectively stated combination but also in other combinations or on their own, without departing from the scope of the present invention.

BRIEF DESCRIPTION OF THE DRAWINGS

Further features and advantages of the invention will become evident from the following description of preferred exemplary embodiments, and with reference to the drawings, in which.

DESCRIPTION OF THE PREFERRED EMBODIMENTS

Figure 1:
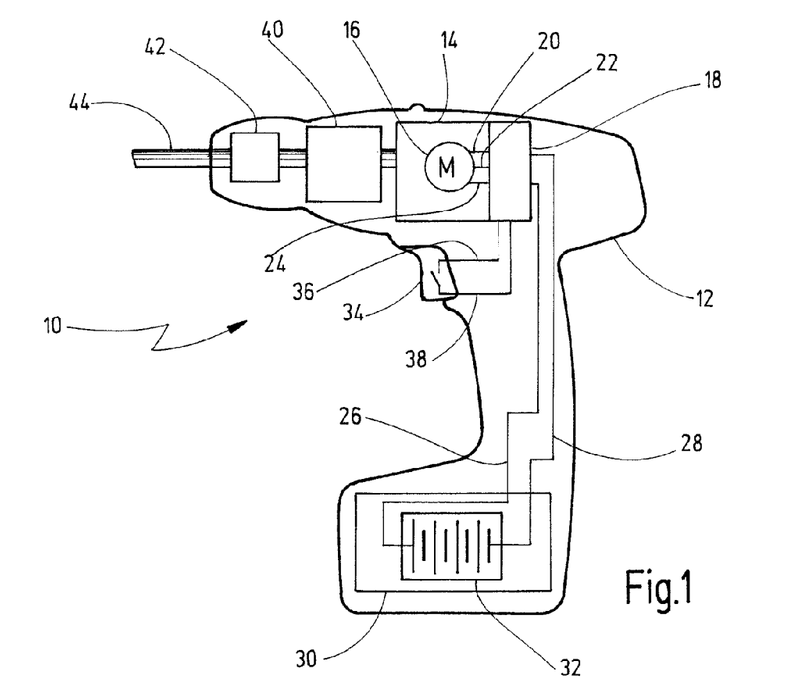
FIG. 1 shows a schematic illustration of a hand-held tool having an electric motor according to the invention.

FIG. 1 schematically illustrates a hand-held tool, which is annotated 10 overall.

The hand-held tool 10 has a housing 12 in which a drive 14 is held, with an electric motor 16 and a motor controller 18. By way of example, the electric motor 16 has three contacts 20, 22, 24, via which, for example, current can be passed through three winding phases U, V, W. This may therefore be an electric motor to which a rotating field is applied and which is provided with a rotor with permanent-magnet excitation.

The motor controller 18 is designed to apply the alternating field to the phases of the motor U, V, W. This type of excitation may be electronic commutation. The alternating field may in this case have a sinusoidal waveform, may be in block form or else may have a pulse-width modulated signal waveform in block form, by means of which it is possible to approximate to a sinusoidal waveform.

The motor controller 18 is coupled to a power supply device 30 via supply lines 26, 28. As is illustrated in FIG. 1, the power supply device 30 may have a rechargeable battery 32, which supplies direct current to the motor controller 18 via the supply lines 26, 28.

The motor controller 18 can equally be connected to external power supply devices, for example power supply units or rectifiers.

A switch 34, via which an operator can activate the hand-held tool 10, is provided in a grip area of the housing 12 of the hand-held tool 10. The switch 34 is coupled to the motor controller 18 via signal lines 36, 38.

The drive 14 is designed to drive a tool 44. By way of example, a gearbox 40 for matching the rotation speed, torque or rotation direction, or a clutch 42, may be connected between the drive 14 and the tool 44. The clutch 42 may have means for holding and replacement of various tools. Furthermore, the clutch 42 may be designed to disconnect the power drive between the drive 14 and the tool 44 in the event of an excessively high torque or torque rise, in order to protect the drive 14 or the gearbox 40 against overloads.

In the present case, the hand-held tool 10 is in the form of a rechargeable-battery drill or rechargeable-battery screwdriver. The components shown may, however, also be used without any problems in hand-held tools with an oscillating output drive, such as jigsaws or scroll jigsaws, with a rotationary oscillating output drive, for example oscillating grinders or oscillating saws, and they can likewise also be used in many other hand-held tools which are suitable for further purposes.

Figure 2:
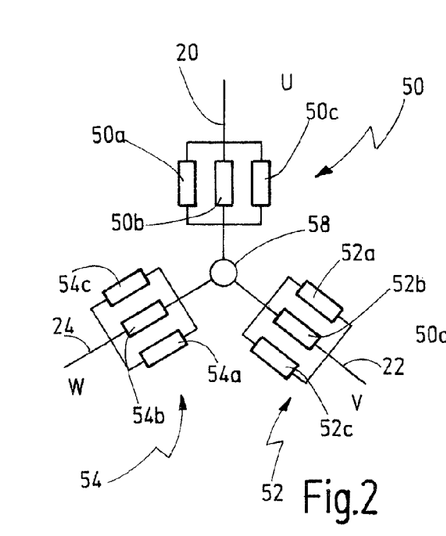
FIG. 2 shows a simplified circuit diagram of a star parallel circuit for production of a rotating field in an electric motor according to the invention.

FIG. 2 shows an example of an arrangement of field windings 50, 52, 54 which can be used to produce the rotating field in the electric motor 16. The individual phases U, V, W are associated with the contacts 20, 22, 24. Each of the phases U, V, W is associated with three field windings connected in parallel. The phase U can be driven via the contact 20, and is provided with the parallel-connected field windings 50a, 50b, 50c. The phase V can be driven via the contact 22 and has the field windings 52a, 52b, 52c connected in parallel. The third phase W is provided with the contact 24 and the three parallel-connected field windings 54a, 54b, 54c.

Furthermore, the field windings 50, 52, 54, which have been connected in this way are connected to one another via a contact 58 in the form of a star point. As has already been indicated in FIG. 2, the star point need not be simply just at a point in space, but may always have a flat or spatial extent for matching to given physical space conditions.

It is self-evident that the field windings 50, 52, 54 can also be connected in delta. It is likewise feasible for the parallel circuits formed in the individual phases U, V, W as shown in FIG. 2 also possibly to be in the form of a series circuit or else a single winding. In consequence, when there are a plurality of field windings 50, 52, 54 for each phase U, V, W, there are in principle four configurations, which can be varied further if required by the addition or disconnection of individual windings. Essentially, this comprises a star circuit in series, a star parallel circuit, a delta circuit in series and a delta parallel circuit.

This makes it possible to cover a wide range of possible achievable rotation speeds and torques with just one initial configuration.

Figure 3:
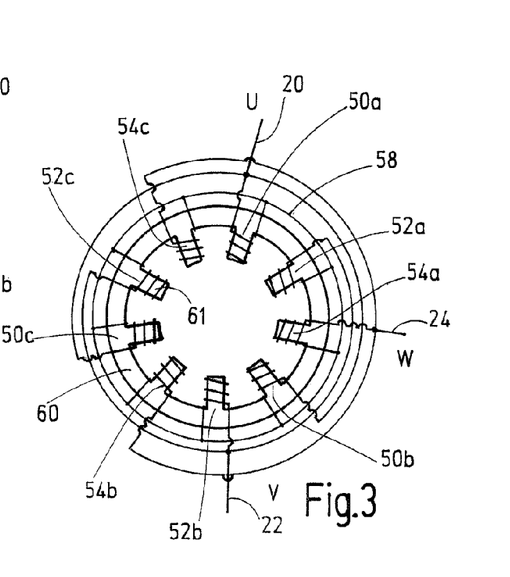
FIG. 3 shows an alternative schematic illustration of the circuit shown in FIG. 2, with a contact indicated.

FIG. 3 shows an alternative schematic illustration of the winding arrangement from FIG. 2. The windings of the individual phases U, V, W are in this case held on a stator 60. The stator 60 is annular and has webs which extend radially inward and are in the form of teeth 61 on the individual field windings 50a, 50b, 50c, 52a, 52b, 52c, 54a, 54b, 54c. In order to avoid eddy currents, the stator 60 may have a core composed of a plurality of layers of stator laminates (not illustrated in FIG. 3).

The field windings, which are connected in parallel with one another, of the individual phases U, V, W are in this case arranged offset, thus resulting overall in a sequence of field windings 50a-52a-54a-50b-52b-54b-50c-52c-54c. One end of each field winding is in this case coupled to the common star contact 58. The respective other end of the field windings 50a, 50b, 50c is linked to the contact 20, that is to say to the phase U. The respective other end of the field windings 52a, 52b, 52c is coupled to the contact 22, that is to say to the Phase V. Finally, the respective other end of the field windings 54a, 54b, 54c is coupled to the contact 24, that is to say to the Phase W.

As can be seen at this stage from the simple schematic illustration in FIG. 3, a star parallel circuit of the field windings 50, 52, 54 on an actual stator 60 can involve a large amount of complexity.

For the purpose of the invention, a contact grid is used, which can contribute to simplifying the manufacture of the electric motor 16 and, in particular can considerably reduce the circuit complexity for the field windings 50, 52, 54.

One such contact grid will be explained in more detail with reference to FIGS. 4 to 7.

Figures 4, 5:
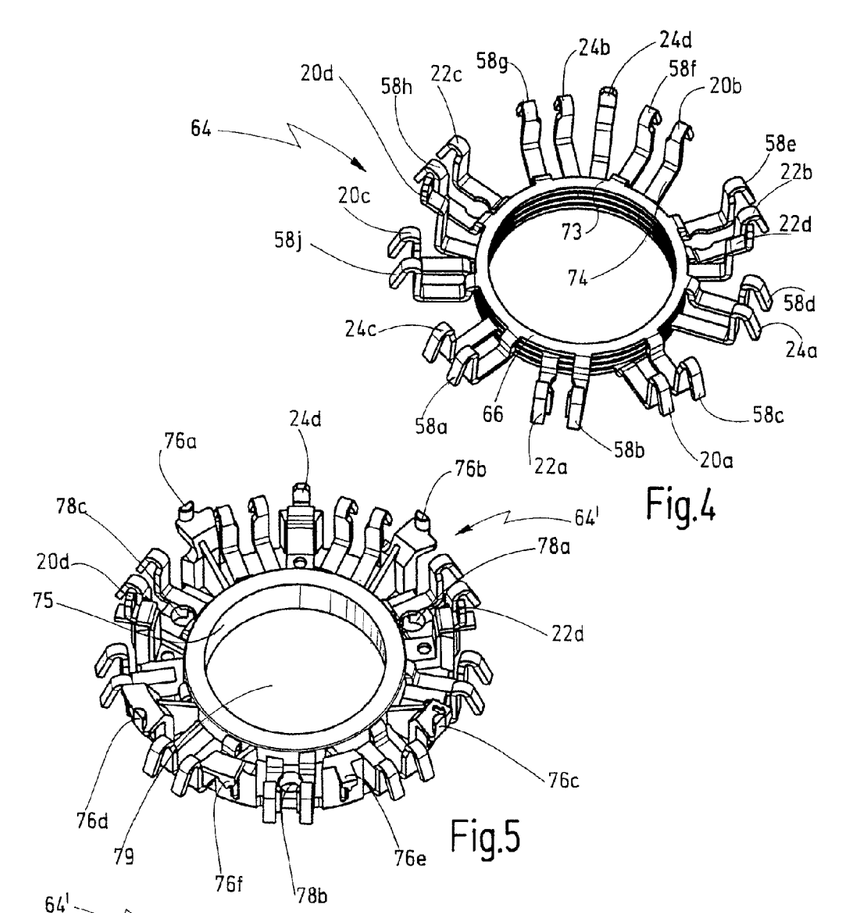
FIG. 4 shows a perspective illustration of a contact grid according to the invention with a plurality of conductor tracks arranged one above the other.
FIG. 5 shows the contact grid shown in FIG. 4, with a support structure in the form of insert moulding.

FIG. 4 shows a contact grid, which is annotated 64, in a state without insert moulding. The contact grid 64 has a plurality of conductor tracks 66, 68, 70, 72, which are insulated from one another.

The conductor tracks 66, 68, 70, 72 have a base body 73 which, for example, may be annular. A plurality of arms 74 extend radially outward from the base body 73. In this case, the contacts 20, 22, 24, 58 can be formed on the arms 74. The conductor tracks 66, 68, 70, 72 are preferably stamped from a flat conductive semi-finished product. By way of example, this may be stamping and bending, as a result of which the stamping process itself can be used to produce the final contour of the arms 74 with the contacts 20, 22, 24, 58. Alternatively, the stamping can be used only to produce a flat, star-shaped semi-finished product, in which further shaping processes are then carried out in the area of the arms 74.

As can be seen from FIG. 4, the conductor tracks 66, 68, 70, 72 have an at least similar contour or geometry, thus allowing synergies to be used in at least some of the manufacturing steps.

The conductor track 66 embodies the star point and is provided with the contacts 58a, 58b, 58c, 58d, 58e, 58f, 58g, 58h, 58j, each of which is not used to make contact with a single field winding 50a, 50b, 50c, 52a, 52b, 52c, 54a, 54b, 54c for example as shown in FIG. 3.

Figure 7:
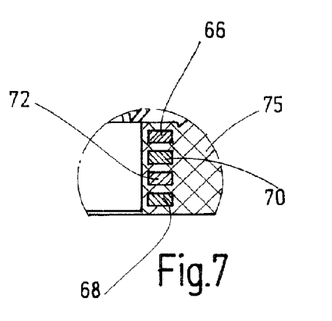
FIG. 7 shows an enlarged cutaway illustration of a detail from FIG. 6.

The conductor track 66 is connected to the conductor track 70, cf. FIG. 7. The conductor track 70 is used to make contact with the phase V, and has the contacts 22a, 22b, 22c, which can be coupled to the field windings 52a, 52b, 52c. The further contact 22d is used for external connection, for example to the motor controller 18.

Accordingly, the conductor track 66, which embodies the star point, has a total of nine contacts, corresponding to the number of individual field windings. In contrast, the conductor track 70 for the phase V has four contacts, of which the three contacts 22a, 22b, 22c are used to make contact with the three field windings 52a, 52b, 52c associated with the phase V. The fourth contact 22d embodies the connection via which the motor controller 18 controls the phase V.

As can be seen from FIG. 7, the conductor track 70 is connected to the conductor tracks 72 and 68. The conductor track 72 is used to connect the field windings 54a, 54b, 54c which are associated with the phase W, and is for this purpose provided with the contacts 24a, 24b, 24c. The contact 24d is used for external coupling and for control by the motor controller 18. The conductor track 68 ensures the connection of the field windings 50a, 50b, 50c which are associated with the phase U. In this case, by way of example, contact can be made with the field winding 50a via the contact 20a, contact can be made with the field winding 50b via the contact 20b, and contact can be made with the field winding 50c via the contact 20c. Finally, the conductor track 68 also has a further contact, the contact 20d, which can be connected to the motor controller 18.

The arms 74 of the conductor tracks 66, 68, 70, 72 can be produced, for example, simply by bending or related shaping processes. Starting from the base body 73, they have transitional areas with transitional radii, essentially straight flat pieces which can be formed for example parallel to or at right angles to the base body and, adjacent thereto, a contact geometry in the form of hooks. In particular, as an alternative, a contact structure in the form of a plug tongue is considered for the contacts 20d, 22d, 24d.

A stack or a pack of conductor tracks 66, 68, 70, 72 can simply be provided by being held on the base body 73, mutual alignment of the base bodies 73 of various conductor tracks 66, 68, 70, 72 and creation of a specific rotation position of the conductor tracks 66, 68, 70, 72 with respect to one another.

Accordingly, at least some of the contacts 20, 22, 24, 58 are advantageously at the same height position or axial position. Fundamentally, they are in this case arranged on planes which run parallel to the base bodies 73. A configuration such as this can considerably simplify subsequent manufacturing steps, in particular making contact and connection.

Figure 6:
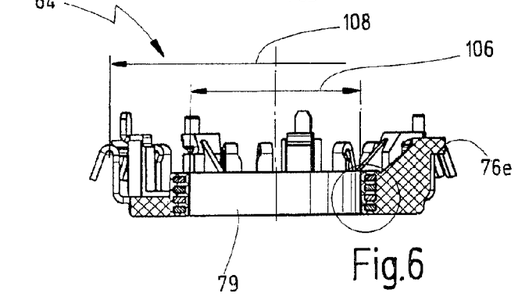
FIG. 6 shows a section view of the contact grid shown in FIG. 5.

In FIGS. 5 to 7, the contact grid is shown in an insert-moulded state, and is annotated 64'.

During insert moulding, the pack of conductor tracks 66, 68, 70, 72 is provided with a support structure 75, which is in general composed of a plastic. In this case, both desired electrical isolation and an improvement in the mechanical robustness as well as the ability to handle the contact grid 64' can be effected in a simple manner during manufacture.

Even after insert moulding with the support structure 75, the contact grid 64' has a central opening 79 which may be, for example, annular or circular. The opening 79 simplifies the assembly processes and can be used for holding and fixing the contact grid 64' during manufacture. A motor shaft which is connected to the rotor can pass through the opening 79 in a completely assembled electric motor 16.

The opening 79 has a free internal diameter 106. Furthermore, at 108 FIG. 6 illustrates an external diameter of the contact grid 64', which is governed essentially by the contacts 20, 22, 24, 58 of the arms 74 which project laterally.

In compact high-power motors, the internal diameter can advantageously be about 15 to 30 mm, preferably 18 to 24 mm, and furthermore preferably approximately 22 mm, and the external diameter can advantageously be about 35 to 60 mm, preferably 40 to 45 mm, and furthermore preferably approximately 42 mm. The internal diameter 106 is in this case oriented on an internal diameter 110 of the stator 60, and the external diameter 108 is oriented on an external diameter 112 of the stator 60, as also FIG. 12. Overall, this allows a compact electric motor with a high power density.

In addition to increasing the mechanical robustness and the electrical isolation, the support structure 75 may also contain shape elements for further simplifying the assembly process. In this case, these may be tabs 76a, 76b, 76c, 76d which, in the present case, are held on the support structure 75 as cylindrical segments, for example half-cylinders, with an axial extent. Furthermore, the contact grid 64 has recesses 78a, 78b, 78c, through which holding pins can pass, for example during manufacture or in the assembled state. Tabs 76e, 76f are likewise indicated, extend radially outward from the support structure 75 and, for example, allow an angled association between the contact grid 64' and the stator 60, cf. FIG. 13 and FIG. 14.

Furthermore, FIG. 6 indicates a cross section of the tab 76e.

Figure 8:
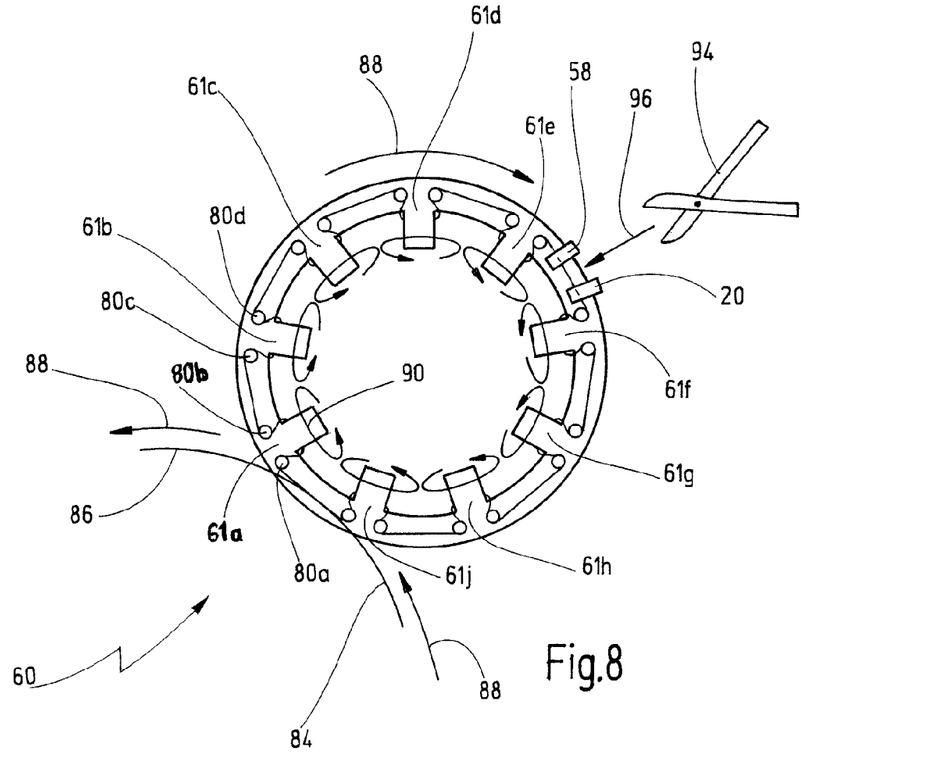
FIG. 8 shows a simplified schematic illustration of a stator according to the invention with a winding arrangement.

FIG. 8 shows a schematic illustration of the stator 60 and, in particular, illustrates the production of the arrangement of the field windings 50, 52, 54, as is indicated by way of example in FIG. 3.

A plurality of teeth 61 are provided on the stator 60, and each represent the core of one field winding 50, 52, 54. Each tooth 61 in this case has two associated projections 80, which are used to change the direction of a winding wire 82.

The winding process starts at a starting point of the winding wire 82, which is annotated 84. The rough winding direction is indicated by arrows annotated 88. First of all, starting from the starting point 84, the wire is passed around the projection 80a on the first tooth 81a. The first tooth 61a is then wound. The winding sense around the teeth 61 is indicated by an arrow annotated 90. After the tooth 61a has been wound, the direction of the winding wire 82 is changed around the projection 80b in the direction of the projection 80c of the next tooth 61b. Subsequently, all of the teeth 61a-61j are wound. At the end of the winding process, the winding wire 82 crosses the starting point 84 of the winding wire on its way to the winding end, which is annotated 86.

This allows the stator 60 to be wound with a continuous winding wire 82. In particular, continuous winding is possible. At the end of the winding process, all the field windings 50, 52, 54 are now connected in series. This configuration is not yet suitable for production of a rotating field for an electric motor which can be commutated electronically.

In a simplified form, two of the contacts are indicated at 20 and 58 in FIG. 8, between which, according to the invention, the winding wire 82 can be cut in order to connect the arrangement of the field windings 50, 52, 54 as shown in FIG. 3, for example. This process is carried out after the contact grid 64' has been fed to the stator 60.

Accordingly, after feeding of the contact grid 64, the wound stator 60 has a configuration in which the intended circuitry can be implemented simply by cutting the winding wire 82, for example at a position indicated by an arrow that is annotated 96, by means of a cutting tool 94 (illustrated in a highly simplified form schematically). A total of nine cutting processes are required for this purpose in the embodiment shown in FIG. 8.

Figure 9:
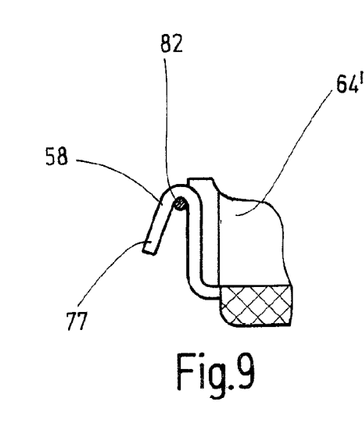
FIG. 9 shows an enlarged cutaway view of a contact with a winding wire in the open position.

FIG. 9 shows a simplified detail of the contact grid 64 as shown in FIG. 6, in the area of the contact 58. Furthermore, the winding wire is indicated at 82. It is self-evident that the illustrated configuration is possible only after the contact grid 64' has been fed to the stator 60, cf. FIG. 13 and FIG. 14. The stator 60 has not been illustrated in any more detail in FIGS. 9 and 10.

The contact 58 as shown in FIG. 9 is in the form of a hook 77, which is open, and the winding wire 82 is held between the two limbs of the hook 77.

Figure 10:
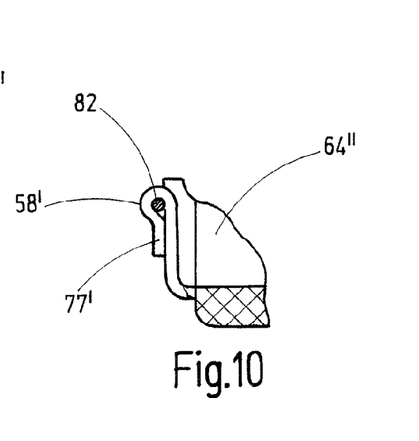
FIG. 10 shows a view as shown in FIG. 9, in which the winding wire has been fixed by the contact.

In FIG. 10 the hook 77' is closed, as a result of which the winding wire 82 is fixed to the contact 58', which is now closed. By way of example, the hook 77' can be closed mechanically by crimping or clamping, or else integrally by welding, soldering or bonding. In this case, it is preferable for the limbs of the hook 77 to be welded. Once all of the contacts 20, 22, 24, 58 have been closed, then this results in the contact grid being in a state as indicated at 64'', in which the contact grid 64'' is fixed to the stator 60. The closing of the contacts 20, 22, 24, 58 in consequence results not only in contact being made with the winding wire 82, but also in the contact grid 64'' being secured in position.

As can be seen in conjunction with FIG. 8, the winding wire 82, which is now fixed for example between the contacts 20 and 58, is fixed sufficiently to make it possible to cut through between the contacts 20 and 58 by means of the cutting tool 94, as is indicated by the arrow 96. In this case, it is self-evident that it is preferable not simply to cut through the winding wire 82 in this case but furthermore to remove material during the cutting process, or else to reshape the resultant ends of the winding wire 82, such that this results in a sufficiently large separation in the cut. This ensures good isolation after the cutting process.

Subsequently, the winding wire 82 is cut through between in each case two of the teeth 61, thus resulting in the circuitry shown in FIG. 3

Figure 11:
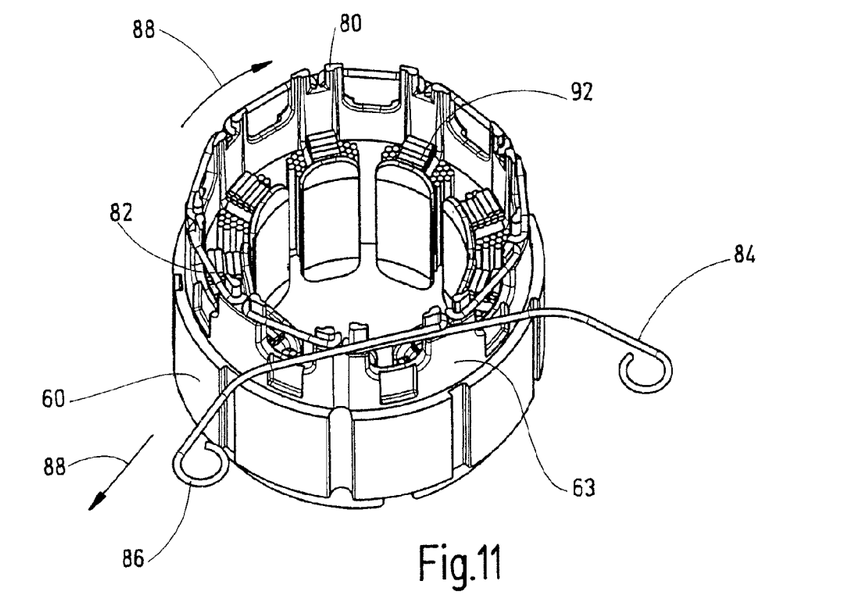
FIG. 11 shows a perspective illustration of a stator according to the invention with a winding arrangement.
Figure 12:
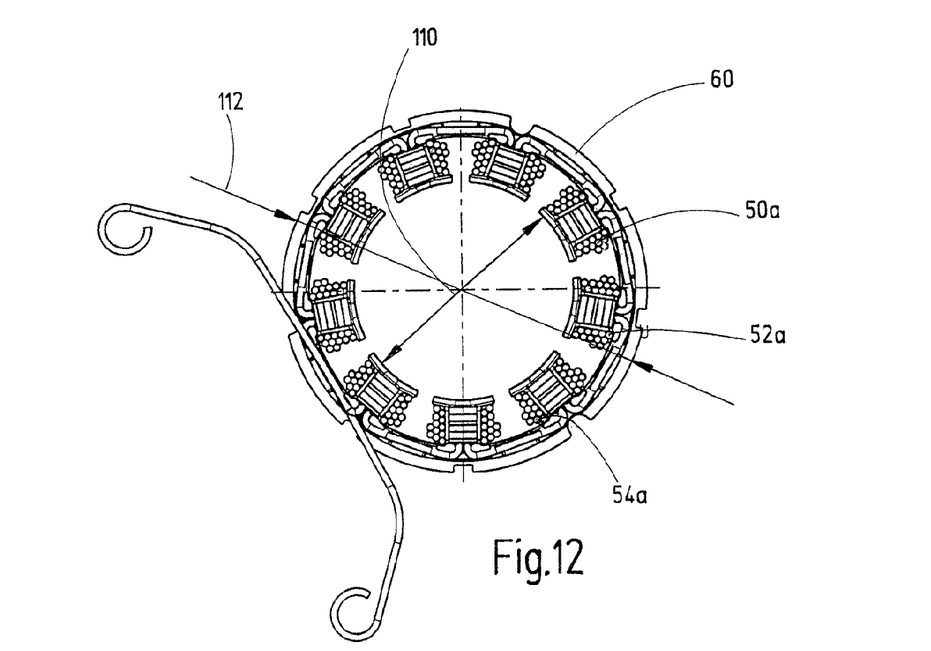
FIG. 12 shows a view of the stator as shown in FIG. 11.

FIGS. 11 and 12 show the wound stator 60. For simplicity reasons, the profile of the winding wire 82 has not been illustrated completely in this case. The rough winding sense can be seen from the arrows 88.

As has already been indicated, it is particularly preferable for all the field windings 50, 52, 54 to first of all be wound continuously from the winding wire 82. It is likewise feasible, for example, to wind any sections of the field windings 50, 52, 54 continuously. In this configuration as well, a simple connection, which can be produced with little effort, can be obtained by using the contact grid 64.

Normally, the stator 60 has a plurality of stator laminates which are arranged axially one behind the other. The stator laminates are insulated in a suitable manner from the field windings 50, 52, 54.

Furthermore, the stator 60 is at least partially insert-loaded 63, allowing the stator laminates to be fixed, and providing the isolation. In this case, the projections 80 are advantageously part of the insert moulding 63.

Figure 13:
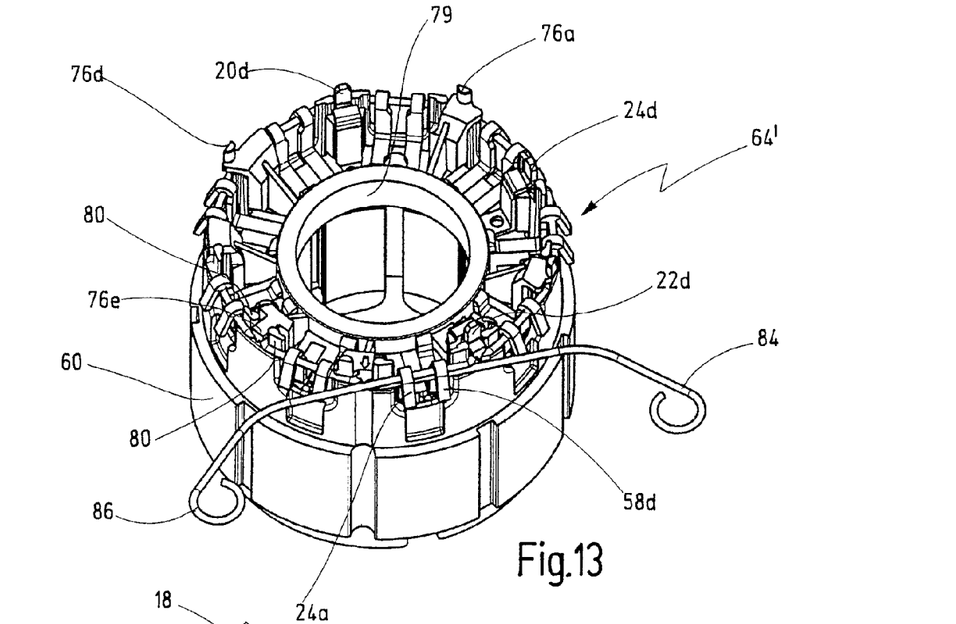
FIG. 13 shows a perspective illustration of an arrangement of the stator as shown in FIG. 11 with the contact grid as shown in FIG. 5.

Starting from the state illustrated in FIGS. 11 and 12, FIG. 13 shows a configuration in which the contact grid 64' has been fed to the stator 60. In this case, for example, the tab 76e engages in an area between two projections 80 on the stator 60, and assist the process of fixing in position. While the contacts which are intended to make contact with the field windings 50, 52, 54 are already engaged with them, the contacts 20d, 22d, 24d, which are intended to make contact with the motor controller 18, project upward out of the assembly.

FIG. 12 furthermore shows the internal diameter 110 and the external diameter 112 of the stator 60. A motor shaft with a rotor can be held within the internal diameter 110, while maintaining the air gap. Since the internal diameter 106 of the stamped grid 64' (cf. FIG. 6) is oriented on the internal diameter 110 of the stator 60, the rotor can also be passed through the opening 79 after the stamped grid 64' has been fitted. FIG. 13 likewise shows that the stamped grid 64' does not project on the circumferential side, or at least does not project significantly beyond the stator 60, since the external diameter 108 of the stamped grid 64' is oriented on the external diameter 112 of the stator 60. This therefore makes it possible to achieve a compact form, like a cartridge, for the electric motor 16, and for the drive 14 overall.

Based on the state illustrated in FIG. 13, fixing of the winding wire 82 to the contacts 20, 22, 24, 58 not only allows contact to be made but also allows the contact grid 64' to be secured in position with respect to the stator 60. Analogously to FIGS. 9 and 10, the fixing process can in this case be carried out, for example, by welding. The winding wire 82 can now be cut through between in each case two of the contacts, for example between the contacts 24a and 58d, as has already been explained with reference to FIG. 8. Contact can be made easily and quickly, in this case, in particular on a revolving transfer machine.

Advantageously, the starting point 84 of the winding wire 82 is first of all fixed on the apparatus side throughout the winding process, and the starting point 84 and the end 86 of the winding wire are initially fixed on the apparatus side after the winding process, in order to ensure the correct profile of the winding wire 82. After the joining process and the process of cutting through for making contact, components of the winding wire 82 which are no longer required can be removed.

Figure 14:
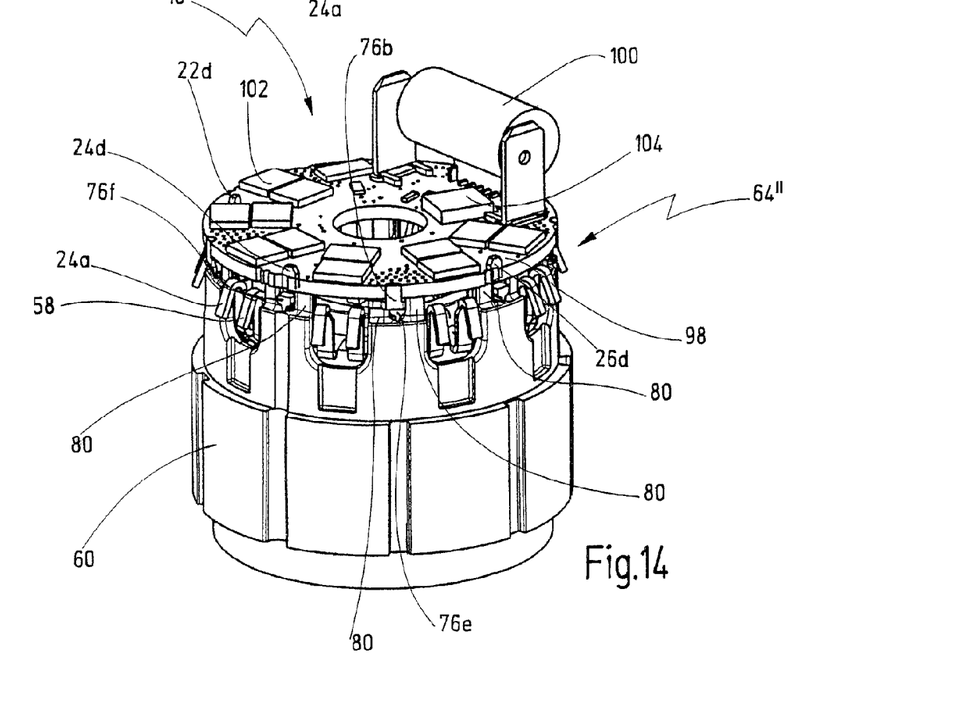
FIG. 14 shows a perspective illustration of the arrangement as shown in FIG. 13, in which a motor controller is also shown.

On the basis of FIG. 13, FIG. 14 shows the stator 60 with the contact grid 64'' and the motor controller 18. For simplicity reasons, the illustration does not show the completely wound winding wire 82, which is cut through between pairs of contacts 20, 22, 24 with the contacts 58, or the shaped hooks 77' of the contacts 20, 22, 24 and 58. This can be seen in any case from FIGS. 8 and 10.

The motor controller 18 has a printed circuit board 98 on which, for example, a capacitor 100, a plurality of power switches 102 as well as a processor or logic 104 for control purposes can be held. Contact is made between the printed circuit board and the contact grid 64'' via the contacts 20d, 22d, 24d. The tabs 76a, 76b, 76c, 76d in this case allow the motor controller 18 to be aligned with respect to the stator 60 and the contact grid 64''. The axial position association between the printed circuit board 98 in the motor controller 18 and the stator is ensured via the projections 80.

Overall, this therefore allows an extremely compact, high-performance form for the electric motor 16, which is furthermore distinguished by the capability to produce it easily, and being highly suitable for automated manufacture.

What is claimed is:

1. An electric motor for an electric tool, the motor comprising:
   a rotor having a permanent-magnet excitation;
   a stator having a plurality of field windings which are wound at least partially from a winding wire;
   a contact grid for making contact with said field windings, said contact grid comprising a support structure holding a plurality of tabs;
   a plurality of conductor tracks provided on said contact grid, said conductor tracks being insulated from one another, said conductor tracks molded together with said support structure as one piece;
   a plurality of contacts provided on said conductor tracks to which said winding wire is fixed;
   a motor controller coupled with said field windings via said contact grid for powering said field windings for generating a rotating electric field;
   wherein said winding wire is severed between selected ones of said contacts for electrically connecting said field windings in a manner suitable for generating said rotating electric field when being powered by said motor controller;
   wherein selected first ones of said tabs extend axially from the support structure and cooperate with mating apertures in said motor controller so as to align said motor controller with respect to said contact grid and to mount said motor controller on the support structure of said contact grid,
   wherein the selected first ones of said tabs are formed of an electrically insulative material such that said motor controller is mounted on the support structure of said contact grid in an electrically insulative fashion, and
   wherein selected second ones of said tabs extend radially outward from the support structure and cooperate with mating features provided in or on an inner surface of said stator so as to align said contact grid with respect to said stator when at least a portion of said contact grid is inserted into said stator.

2. The electric motor of claim 1, wherein said conductor tracks are stamped or cut out of a flat conductive sheet.

3. The electric motor of claim 1, wherein each of said conductor tracks comprises a substantially annular-shaped base body, from which at least one arm projects, on which said contacts are formed.

4. The electric motor of claim 1, wherein said contacts are configured for fixing said winding wire by clamping or joining.

5. The electric motor of claim 1, wherein four conductor tracks are provided, three conductor tracks of which are each configured for contacting one phase of said field windings, a fourth conductor track being configured for contacting a star point.

6. The electric motor of claim 1, wherein said contact grid comprises a plastic insert moulding surrounding said support at least partially.

7. The electric motor of claim 1, wherein said contact grid further comprises contacts for making contact with a motor controller.

8. The electric motor of claim 1, wherein said stator further comprises a plurality of projections being configured for guiding said winding wire.

9. The electric motor of claim 1, wherein said contact grid has an external diameter and further comprises an opening with a free passage, said opening having an internal diameter, wherein a ratio of said internal diameter divided by said external diameter is from 1:1.5 to 1:2.5.

10. The electric motor of claim 9, wherein said internal diameter corresponds essentially to an internal diameter of said stator of said electric motor and is 15 to 30 mm.

11. The electric motor of claim 1, wherein said field windings are wound continuously from said winding wire.

12. The electric motor of claim 1, wherein said field windings are connected in star or delta.

13. The electric motor of claim 1, wherein at least some of said field windings are connected in parallel.

14. An electric motor comprising:
   a rotor;
   a stator having a plurality of field windings which are wound at least partially from a winding wire;
   a contact grid for making contact with said field windings, said contact grid comprising a support structure holding a plurality of tabs;
   a plurality of conductor tracks provided on said contact grid, said conductor tracks being insulated from one another, said conductor tracks molded together with said support structure as one piece;
   a plurality of contacts provided on said conductor tracks to which said winding wire is fixed;
   a motor controller coupled with said field windings;
   wherein said winding wire is severed between selected ones of said contacts; and
   wherein selected first ones of said tabs extend axially from the support structure and cooperate with mating apertures in said motor controller so as to align said motor controller with respect to said contact grid and to mount said motor controller on the support structure of said contact grid,
   wherein the selected first ones of said tabs are formed of an electrically insulative material such that said motor controller is mounted on the support structure of said contact grid in an electrically insulative fashion, and
   wherein selected second ones of said tabs extend radially outward from the support structure and cooperate with mating features provided in or on an inner surface of said stator so as to align said contact grid with respect to said stator when at least a portion of said contact grid is inserted into said stator.

15. A method of producing an electric motor which can be commutated electronically, comprising the following steps:
   providing a motor controller for generating a rotating electric field;
   providing a rotor;
   providing a stator;
   winding a plurality of field windings at least partially continuously from a winding wire on said stator;
   providing a contact grid having a plurality of conductor tracks being insulated from one another to said stator, wherein said conductor tracks have a plurality of contacts, and wherein said contact grid comprises a support structure holding a plurality of first tabs extending axially from the support structure and configured to cooperate with mating apertures in said motor controller so as to align said contact grid relative to said motor controller and a plurality of second tabs extending radially outward from the support structure and configured cooperate with mating features provided in or on an inner surface of said stator so as to align said contact grid relative to said stator, said conductor tracks molded together with said support structure as one piece and the motor controller being mounted on the support structure;

attaching said contact grid onto said stator by inserting at least a portion of said contact grid into said stator while engaging said second tabs with the mating features provided in or on an inner surface of said stator so as to align said contact grid relative to said stator;

fixing said winding wire on selected contacts on said conductor tracks;

attaching said motor controller onto said contact grid while engaging said first tabs on the support structure with the mating apertures in said motor controller so as to align said motor controller relative to said contact grid;

wherein the first tabs are formed of an electrically insulative material such that said motor controller is mounted on the support structure of said contact grid in an electrically insulative fashion, coupling said motor controller with selected ones of said contacts; and severing said winding wire between selected ones of said contacts for electrically connecting said field windings in a manner suitable for generating said rotating electric field when being powered by said motor controller.

16. The method of claim 15, which further comprises the step of clamping or joining said conductor tracks to selected ones of said contacts for fixing said winding wire and said contact grid.

17. The method of claim 15 wherein the step of providing the contact grid comprises the following steps: arranging and aligning the plurality of conductor tracks separated and in a selected relative position with respect to one another; and encapsulating the plurality of conductor tracks for producing said support structure.

18. The electric motor of claim 1, wherein the selected first ones of said tabs held on the support structure as cylindrical segments.

19. The electric motor of claim 14, wherein the selected first ones of said tabs held on the support structure as cylindrical segments.

20. The method of claim 15, wherein the selected first ones of said tabs held on the support structure as cylindrical segments.

* * * * *